United States Patent [19]

Gyürki

[11] 3,970,796
[45] July 20, 1976

[54] TIME-DIVISION-MULTIPLEX ARRANGEMENT
[75] Inventor: Karoly Gyürki, Bolligen, Switzerland
[73] Assignee: Siemens-Albis AG, Zurich, Switzerland
[22] Filed: Oct. 7, 1974
[21] Appl. No.: 512,453

[30] Foreign Application Priority Data
Oct. 10, 1973  Switzerland.......................... 14399/73

[52] U.S. Cl. .......................... 179/15 AF; 179/15 BS
[51] Int. Cl.² ............................................. H04J 3/06
[58] Field of Search .................... 179/15 BS, 15 AF; 178/69.5 R

[56]  References Cited
UNITED STATES PATENTS
3,855,533   12/1974   Schüeli............................. 179/69.5 R
3,869,579   3/1975   Karl................................. 179/15 BS

*Primary Examiner*—David L. Stewart
*Attorney, Agent, or Firm*—Werner W. Kleeman

[57]  ABSTRACT

A synchronization arrangement for a TDM concentrator in which phase differences between the transmission line clock and the internal concentrator clock are compensated for by lengthening or shortening a signalling channel (Ksynch).

9 Claims, 4 Drawing Figures

TIME-DIVISION-MULTIPLEX ARRANGEMENT

The present invention relates to a t.d.m. (time-division-mutliplex) arrangement for compensating changes in the mutual phase position or state of the timing pulse frames of a PMC t.d.m. (time-division-multiplex) transmission line via which the individual PCM words are transmitted in serial form in one time slot, comprising a corresponding number of time elements, of time slots which occur in a cyclic sequence in pulse frames of a line bit pulse train which governs the t.d.m. transmission line and determines the time elements, and of a connected t.d.m. switching device in which the individual PCM words are in each case transmitted in parallel form within one time slot of time slots which occur in a cyclic sequence in pulse frames of an internal word pulse train which governs the t.d.m. switching device. In the t.d.m. switching device, at the receiving end thereof there is provided a serial-parallel converter which is individually assigned to the transmission line with a following one word-intermediate store which at the input end is operated in a receiving end external word pulse train which corresponds to the line bit pulse train governing the t.d.m. receiving line, and which at the output end is operated in each case in one of two intermediate work pulse trains which are uniformly displaced from one another with the period of the internal word pulse train and leads to another store which is individually assigned to the line and at the output end is operated in the internal word pulse train, and/or at the transmitting end there is provided a parallel-serial-converter which is individually assigned to the transmission line with a preceding store which at the output end is operated in a transmitting end external work pulse train which corresponds to the line bit pulse train governing the t.d.m. transmission line.

The function of telecommunications switching systems is to establish and subsequently to clear connections between telecommunications stations which are spatially separate from one another, namely the subscribers of the relevant exchange who desire an exchange of data. The telecommunications stations are for this purpose connected via individual telecommunications lines ot the exchange; within the actual central switching device, telecommunications lines which are to be connected to one another are in each case connected via a suitable switching arrangement for the duration of the desired connection, whereby a plurality of telecommunications transmission channels which in each case connect two telecommunications stations in each case run through the central switching device.

In conventional telecommunications-, in particular telephone exchanges, analogue signals which are continuous in time are transmitted in transmission channels which are spatially separate from one another. More recent telephone exchanges do not employ the space multiplex principle but the time-division-multiplex principle in accordance with which there are transmitted analogue signals which are discontinuous in time. More recently telephone exchanges in which likewise discontinuous, digital signals are transmitted are also increasingly gaining significance; in this context, pulse code modulation (PCM) has acquired special importance, in which at periodically consecutive points of time the instantaneous amplitude values of the speech signal are portrayed by binary words which are then transmitted.

The actual central switching device forms only a part of the exchange as a whole; another part is formed by the aforementioned telecommunications lines leading from teh central switching device to the subscribers and a further part is formed by the subscriber stations themselves. In order to keep small the outlay required for this part of the exchange which is mainly determined by the copper outlay for the lines, it is fundamentally known to give preference to parts of the central switching device and to arrange these in the vicinity of a group of subscribers as so-called concentrators and to provide between these concentrators and the central switching device only a number of transmission channels corresponding to the number of simultaneously existing connections, whereby the number of devices to be provided in the central switching device for each transmission channel is correspondingly reduced, as in fact has been known since the introduction of pre-selectors and call hunting devices in conventional exchange systems. In this context it is known to combine the subscriber lines of a t.d.m. exchange in concentrators which operate accordingly on the t.d.m.. basis in that the line of each subscriber participating in a connection is periodically connected in pulsed fashion via the time channel switch individually assigned to the line to a t.d.m. busbar of the concentrator and in that only one t.d.m. transmission line is provided between t.d.m. concentrator and central switching devices, wherein in addition a PAM-PCM conversion takes place between t.d.m. concentrator and t.d.m. transmission line, so that, considered from the transmission line, concentrator and central switching device represent PCM t.d.m. exchanges (see BSTJ XXXVIII (1959), 4, 909 ff, 914).

The satisfactory switch-through of a connection in a PCM t.d.m. exchange is conditional upon the binary words which are to be switched through or which have been switched through being available at the correct time for switch-through and further transmission, respectively. This condition is not fulfilled initially, as the frequency and/or phase of the word pulse train which governs such a switching device does not always readily correspond to the frequency and phase of the word pulse train which governs a PCM t.d.m. line leading to and from the relevant PCM t.d.m. switching device so that displacements occur in the pulse frames of the external word pulse train governing the PCM t.d.m. transmission line in relation to the pulse frames of the internal word pulse train governing the PCM t.d.m. switching device.

In this context, a process is known for compensating changes, caused in particular by changes in transit time in the transmission of PCM information signals from a PCM transmitting station via a transmission link to a PCM receiving station, upon the occurrence of the relevant PCM information signals in the PCM receiving station in relation to the time at which the relevant PCM information signals are forwarded from the PCM receiving station — wherein the signal elements which form the relevant PCM information signal and which are transmitted within a time slot of a cyclic sequence of time slots in a pulse frame are transmitted from the PCM transmitting station to the PCM receiving station in serial fashion and in the PCM receiving station are forwarded in parallel within such a time slot compartment. In accordance with such process when signal elements of a PCM information signal are present in parallel form in the PCM receiving station, these signal elements are linked with one pulse of an interrogation pulse train which supplies at least two pulses in each time slot to produce a control signal, upon the occurrence of which there is brought about transmission of the relevant signal elements. This known technique or process permits PCM information signals whose times of occurrence deviate within relatively wide limits in the relevant time slots to be forwarded from the particular PCM receiving station without the necessity to alter the instant of forwarding within the relevant time slots. In this case the signal elements forming the relevant PCM information signal can be forwarded upon the occurrence of one pulse of a transfer pulse train, each pulse of which is transmitted between two pulses of the interrogation pulse train; it is thus possible to compensate fluctuations in the instant or point in time of occurrence of the relevant PCM information signal with respect to the time point of the occurrence of a pulse of the interrogation pulse train in that whenever there is an overshooting of the time at which there is a change in the time of the transfer of the PCM information signals within the following time slots, the relevant instant of transfer is shifted away from the first-mentioned instant; i.e. a certain hysteresis is introduced for the transfer.

The known process expediently enables compensation of phase fluctuations occurring on the transmission link, known as jitters, in the word pulse train which governs the PCM t.d.m. transmission line in relation to the word pulse train which governs the t.d.m. switching device. Frequently however, it is not only necessary to compensate phase fluctuations caused by jitter phenomena, but it is also necessary to take into account greater phase shifts acting in one and the same direction which can e.g. be due to the fact that the t.d.m. transmission line and the t.d.m. switching device are anyhow operating asynchronously to one another. In such a case, even when the known technique is employed, the danger of falsification of data or information transmitted or to be transmitted in a telecommunications time channel increases. The aim of the present invention is to provide a t.d.m. arrangement in which this disadvantage does not exist.

In accordance with the invention this is achieved in that stores likewise designed as one-word-intermediate stores are operated at the output end in the internal word pulse train and at the output end in the transmitting-end external word pulse train. A one word-intermediate store of this kind, operated in the external word pulse train at the input end is operated in each case in one of the two intermediate word pulse trains which are displaced uniformly in relation to one another and is connected subsequently to a further one-word-intermediate store which is individually assigned to the line and which at the input end is operated in the internal word pulse train. In each case in the event of a phase difference, overshooting or undershooting a given boundary value or limit amount, between the pulse frames of an external word pulse train and those of the currently active intermediate word pulse train, in the pulse frames of the intermediate word pulse train there is a change to the particular other intermediate word pulse train between two time slots, of two telecommunications time channels between the time slots of which in the pulse frames of the external word pulse train there lies one time slot of a special time channel provided in addition to the actual telecommunications time channels, wherein however at the switching device end, one time slot of the special time channel provided in addition to the actual telecommunications time channels is suppressed or doubled.

The invention provides the advantage that it is possible to take into account phase shifts between the pulse frames of a line bit pulse train governing a PMC t.d.m. transmission line and the corresponding external word pulse train and the pulse frames of an internal word pulse train which governs a PCM t.d.m. switching device without impairing the items of information or data transmitted in the telecommunications time channels, even in the event of asynchronous operation of the t.d.m. switching device and the t.d.m. transmission line. In a further development of the invention, in each case following a phase difference, exceeding a given threshold or limit, between a pulse frame of the receiving-end external word pulse train and a pulse frame of the intermediate word pulse train a change can take place to the particular other intermediate word pulse train which change is, in the pulse frame of the intermediate word pulse train, associated with a reduction in the time slot of a synchronising time channel provided in addition to the actual telecommunications time channels, in which, at the switching-device-end however, the relevant time slot of this synchronising time channel is suppressed; in each case in the event of a phase difference falling below a given limit between a pulse frame of the receiving end external word pulse train and a pulse frame of the intermediate word pulse train, in a further development of the invention a change can take place to the particular other intermediate word pulse train which change is in the pulse frame of the intermediate word pulse train associated with a lengthening of the time slot of a synchronising time channel provided in addition to the actual telecommunications time channels, in which, at the switching-device-end, however, the relevant time slot of the synchronising time channel provided in addition to the actual telecommunications time channels is doubled. The suppression or doubling, at the switching device end, of a time slot of the synchronising time channel which for example in a PCM system 30/32 with 30 telecommunications time channels, one synchronising time channel and one signalling time channel is anyhow provided, does not impair the switch-through of the telecommunications time channels in the t.d.m. switching device. In order also to enable a normal use of the synchronising time channel, according to a further development of the invention, between the serial-parallel converter and the following one-word-intermediate store there can be arranged a gating-out device and/or between the parallel-serial converter and the preceding one-word-intermediate store there can be provided a gating-in device for gating out or in PCM words transmitted or to be transmitted in such a special time channel provided in addition to the actual telecommunications time channels via the PCM t.d.m. transmission line.

The invention can preferably be employed when a plurality of asynchronously operated PCM t.d.m. transmission lines are joined up in a t.d.m. switching device according to which, in a further development of the invention, the one-word-intermediate stores, operated at the output end and at the input end in the internal word pulse train, of a plurality of PCM t.d.m. transmission lines may be connected via coupling switches operable at switching phases assigned to the relevant lines to a common t.d.m. busbar. This t.d.m. switching device can in particular be a concentrator in which, according to a further development of the invention, a PCM-PAM decoder is in each case provided between the one-word-intermediate stores operated at the output end in the internal word pulse train and the associated coupling switches, and a PAM-PCM coder is interposed between the one-word-intermediate stores operated at the input end in the internal word pulse train and the associated coupling switches and wherein the common t.d.m. busbar which forms a concentrator multiplex busbar is connected with a plurality of telephone subscribers thus combined in the concentrator in each case via a time channel switch which is connected to a PAM subscriber circuit.

The invention will be explained in detail in the following in the form of an example making reference to the drawings.

Figure 1:
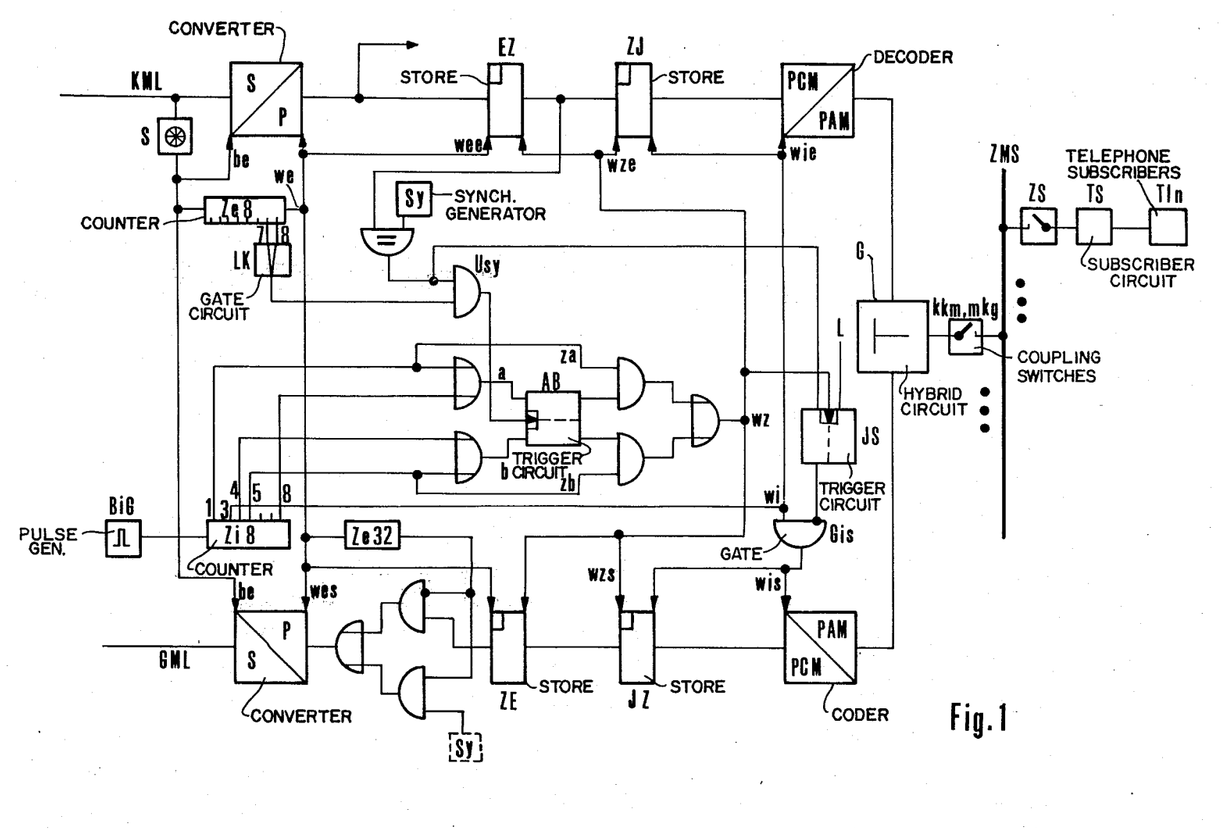
FIG. 1 shows a t.d.m. concentrator in which a t.d.m. arrangement is realised in accordance with the invention.

FIG. 1 schematically illustrates, on a scale required for the understanding of the invention, a t.d.m. concentrator in which a t.d.m. arrangement is realised in accordance with the invention. This concentrator will be assumed to combine a plurality of telephone subscribers Tln which may in each case be periodically connected in pulsed fashion via a time channel switch ZS connected to a PAM subscriber circuit TS to a concentrator t.d.m. busbar ZMS. The latter will be assumed to be connected to a central switching device which is not illustrated in the drawing, and in fact via a PCM t.d.m. transmission line KML-GML which is illustrated in FIG. 1. Via the PCM t.d.m. transmission line which, in accordance with the four-wire operation, comprises a receiving t.d.m. line KML and a transmitting t.d.m. line GML, the individual PCM words are transmitted in serial form on a time slot comprising a number of e.g. eight time elements, corresponding to the number of bits in a PCM word, of a cyclic sequence of time slots which occur in pulse frames of a line bit pulse train which governs the t.d.m. transmission line KML-GML and which determines the time elements. In the concentrator connected as shown in FIG. 1 to the t.d.m. transmission line KML-GML, the individual PCM words are in each case transmitted in parallel form within one time slot of time slots occurring in a cyclic sequence in pulse frames of an internal word pulse train which governs the t.d.m. concentrator. In the concentrator at the receiving end there is provided a serial-parallel converter S/P which is individually assigned to the transmission line and which is followed by a one-word-intermediate store EZ which at the input end is operated via a pulse train control line wee in an receiving end external word pulse train which corresponds to the line bit pulse train which governs the t.d.m. receiving line KML, and at the output end is operated via a pulse train control line wze in the particular one of two intermediate word pulse trains uniformly displaced from one another, with the period of the internal word pulse train, which one-word-intermediate store EZ leads to a further store ZJ which is individually assigned to the line and at the output end is operated via a pulse train control line wie in the internal word pulse train; at the transmitting end there is provided a parallel-serial-converter P/S which is individually assigned to the transmission line and which is preceded by a store ZE which is operated at the output end via a pulse train control line wes in a transmitting end external word pulse train corresponding to the line bit pulse train which governs the t.d.m. transmitting line GML. The store ZJ, which at the output end is operated in the internal word pulse train is likewise designed as a one-word-intermediate store, like the store ZE operated at the output end in the transmitting end external word pulse train. This one-word-intermediate store ZE which at the input end is operated via a pulse train control line wzs in the particular one of two intermediate word pulse trains uniformly displaced in relation to one another, is connected subsequently to a further one-word-intermediate store JZ which is individually assigned to the line and at the input end is operated via a pulse train control line wis in the internal word pulse train.

In accordance with FIG. 1 the one-word-intermediate stores ZJ, JZ operated at the output and input ends in the internal word pulse train, of a plurality of PCM t.d.m. transmission lines KML-GML can be connected via coupling switches kkm, mkg operable at switching phases assigned to the relevant lines to the concentrator multiplex busbar ZMS, wherein a PCM-PAM decoder is in each case interposed between the one-word-intermediate store ZJ operated at the output end in the internal word pulse train and the associated coupling switches, and a PAM-PCM coder is interposed between the one-word-intermediate store JZ operated at the input end in the internal word pulse train and the associated coupling switches. In the circuit arrangement shown in FIG. 1, the connection to the t.d.m. busbar ZMS is such that decoder and coder are connected via a hybrid circuit G to a common coupling switch kkm, mkg which realises the aforementioned coupling switches and which enables the connection to the t.d.m. busbar ZMS.

For pulse-train operation, it is indicated in FIG. 1 that the line bit pulse train which is obtained with the aid of a flywheel circuit S from the t.d.m. receiving line KML and which governs the t.d.m. transmission line is delivered or conducted on the one hand to the serial-parallel converter P/S and to the parallel-serial converter S/P via control lines be in each case as a transmission-line control pulse train and on the other hand is delivered into a counter device $Ze8$ with a counting volume corresponding to the number of bits per PCM word, and which device then at its output we emits an external word pulse train which corresponds to the line bit pulse train governing the t.d.m. transmission line and whose timing pulses in each case define the start of a time slot and its first time element, wherein the pulse frames of this external word pulse train in each case lead or lag the pulse frames of the line bit pulse train in each case by one time slot. In the circuit arrangement shown in FIG. 1, the internal word pulse train is obtained from a pulse generator BiG which operates with a pulse train frequency corresponding to the line bit pulse train frequency and whose timing pulse are input into a counter device $Zi8$ with a counting volume corresponding to the number of bits per PCM word; from the output 3, corresponding to the third counting step, of this counter device $Zi8$, via a line wi one obtains the internal word pulse train whose timing pulses in each case define the start of a time slot and its first time element.

The intermediate word pulse trains are likewise derived from the pulse generator BiG via the counter device $Zi8$ and in fact, in accordance with FIG. 1, the one intermediate word pulse train is taken from the output 1, corresponding to the first counter step, of this counter device Zi8 via a line za, and the other intermediate word pulse train is taken from the output 5, corresponding to the fifth counter step, of the counter device Zi8 via a line zb. With the aid of a bistable trigger circuit AB, via a logic coupling or linking circuit, the one line za or the other line zb is switched through to a pulse train line wz which thus conducts the relevant effective intermediate word pulse train, and which is directly connected to the aforementioned pulse train control lines wze and wzs in accordance with FIG. 1.

Figure 2:
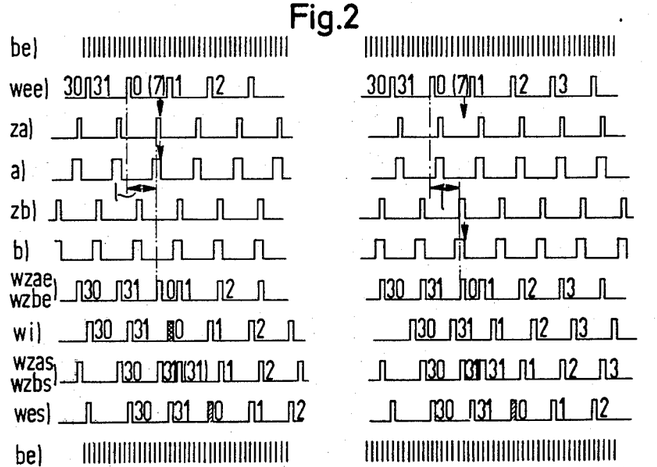
FIGS. 2 and 3 illustrate the time state of timing pulse frames of a t.d.m. arrangement in accordance with the invention.
Figure 3:
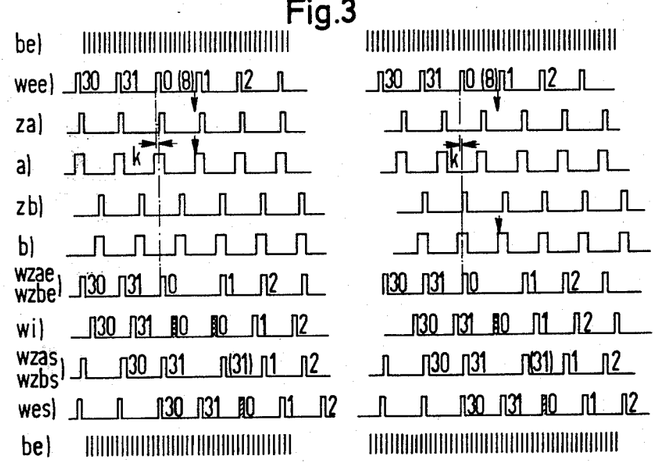

At this point we shall consider the drawings FIG. 2 and FIG. 3 which illustrate the time state of the various timing pulses. In FIGS. 2 and 3 the line bit pulse train is illustrated in the lines be), the receiving-end external word pulse train is illustrated in lines wee) and the transmitting end external word pulse train is illustrated in lines wes). In accordance with the direct connection illustrated in FIG. 1 of the pulse train control line wee leading to the serial-parallel converter S/P and to the one-word-intermediate store EZ, and the pulse train control line leading to the one-word-intermediate store ZE and to the parallel-serial converter P/S to the pulse train line we, here the receiving- end and transmitting-end external word pulse trains agree with one another. Lines wi) illustrate correspondingly, the internal word pulse train, and lines za) and zb) show the two intermediate word pulse trains which are uniformly displaced in relation to one another and which are in each case displaced by two time elements in comparison to the internal word pulse train shown in lines wi). Lines wee) and wes) also show that one pulse frame in each case contains 32 time slots 0, 1, 2 . . . 30, 31, the time slots 0 being the time slot of a synchronising time channel Ksynch provided in a 30/32 PCM system in addition to 30 telecommunications time channels and one signalling time channel.

In practical operation, the frequency and/or phase state of the line bit pulse train governing the t.d.m. transmission line KML-GML and that of the bit pulse train of the pulse generator BiG which governs the concentrator operation will never be entirely identical to one another so that changes will occur in the mutual phase state of the timing pulse frames of the PCM t.d.m. transmission line and the t.d.m. switching device, namely the t.d.m. concentrator, connected thereto. Such changes occur in particular when a plurality of t.d.m. transmission lines which are asynchronous to one another are connected with one and the same t.d.m. switching device operating in an internal pulse train. In order to take such changes into account without or falsifying items of information to be transmitted in a telecommunications time channel, now whenever there is a phase difference, which overshoots or undershoots a given threshold or limit amount, between the pulse frames of an external word pulse train (lines wee) in FIG. 2 and FIG. 3) and those of the currently effective intermediate word pulse train (lines wza, wzb) in FIG. 2 and in FIG. 3) in the pulse frames of the intermediate word pulse train a change is made to the particular other intermediate word pulse train between two time slots (31 and 1 in FIG. 2 and FIG. 3) of two telecommunications time channels, between the time slots of which in the pulse frames of the external word pulse train (lines wee in FIG. 2 and in FIG. 3) there lies a special time channel Ksynch which is provided in addition to the actual telecommunications time channels K1..K31, where at the switching-device-end, however, one time slot 0 of the special time channel Ksynch provided in addition to the actual telecommunications time channels K1 . . . K31 is suppressed or doubled. The given limit will be overshot if the line bit pulse train frequency is greater than the bit pulse train frequency of the pulse generator BiG of the circuit arrangement shown in FIG. 1; such conditions are the basis of the illustration in FIG. 2 in which the maximum permissable phase difference between a pulse frame of the receiving end external word pulse train and a pulse frame of the intermediate word pulse train is marked 1. The given limit will be undershot if the line bit pulse train frequency is smaller than the bit pulse train frequency of the pulse generator BIG of the circuit arrangement shown in FIG. 1; such conditions are the basis of the illustration in FIG. 3 in which the minimum phase difference between a pulse frame of the receiving end external word pulse train and a pulse frame of the intermediate word pulse train is marked K.

We shall firstly consider in more detail the case of a higher line bit pulse train frequency. In FIG. 2 such a case is expressed in a movement of the external timing pulse frames (lines be), wee) ) towards the left whereby the phase difference 1 will increase.

In the left-hand part of FIG. 2 it has been assumed that previously the one intermediate word pulse train in accordance with line za) was effective as shown in line wzae, wzbe) for the time slots 30 and 31. If it now proves that the phase difference between one pulse frame of the receiving-end external word pulse train and a pulse frame of the intermediate word pulse train overshoots the given limit 1, a change is made to the particular other intermediate word pulse train in accordance with line zb) which change is associated with a shortening of the time slot 0 of the synchronising time channel Ksynch provided in addition to the actual telecommunications time channels K1 . . . K31, in the pulse frame of the intermediate word pulse train as can be seen from line wzae, wzbe). In this respect it has been shown in FIG. 2 that this occurs when the seventh time element of the time slot 0 of the receiving end, external word pulse train falls at least partially into a given limit time zone, as illustrated in line a). This limit time zone can be formed by the first time element of the time slot 0 in the intermediate word pulse train za and by the preceding eighth time element of the time slot 31. For this purpose, as illustrated in FIG. 1, the output 1, corresponding to the first counter step, and the output 8, corresponding to the eighth counter step, of the counter device Zi8 in the circuit arrangement shown in FIG. 1 can be conducted via an OR gate to the input a of the bistable trigger circuit AB, whose pulse train input is supplied via an AND gate Usy with a switchover pulse whenever the AND gate Usy is released by an equivalence gate connected to the output of the one-word-intermediate store EZ and to a synchronising word generator Sy, on establishing the occurrence of the synchronising word in the one-word-intermediate store EZ and thus the presence of the time slot 0 of the external word pulse train, and by a gate circuit LK which is connected by one input to the output 7, corresponding to the seventh counter step, of the counter device Ze8 on reaching the seventh counter step.

The right-hand half of FIG. 2 has been based on the assumption that hitherto the other intermediate word pulse train illustrated in line zb) has been effective, as shown in line wzae, wzbe) for the time slots 30 and 31.

If it proves that the phase difference between a pulse frame of the receiving-end external word pulse train and a pulse frame of the intermediate word pulse train overshoots the limit 1, now, correspondingly, a change is made to the intermediate word pulse train za) which in the pulse frame of the intermediate word pulse train is associated with a shortening of the time slot 0 of the synchronising time channel which is provided in addition to the actual telecommunications time channels.

With the change to the particular other intermediate word pulse train, which is associated with a reduction in the time slot 0 of the synchronising time channel K$synch$ provided in addition to the actual telecommunications time channels K1 ... K31, however, the relevant time slot 0 of this synchronising time channel K$synch$ is suppressed at the switching-device end. As shown in line wi) of FIG. 2, this is the case with the change, shown in the right-hand part of FIG. 2, from the intermediate word pulse train wzb to the intermediate word pulse train wza; in the case of the change, shown in the left-hand part of FIG. 2, from the intermediate word pulse train wza to the intermediate word pulse train wzb, this suppression of a time slot is avoided. The change shown in the right-hand part of FIG. 2, from the intermediate word pulse train wzb to the intermediate word pulse train wza occurs when the seventh time element of the slot 0 of the receiving-end external word pulse train wee falls at least in part into a given limit time zone in accordance with line b) which zone will be assumed to be formed by the first time element of the time slot 0 in the intermediate word pulse train zb and the preceding eighth time element of the time slots 31. For this purpose, as shown in FIG. 1, the output 4 corresponding to the fourth counter step and the output 5 corresponding to the fifth counter step, of the counter device $Zi8$ can be conducted via an OR gate to the other input b of the bistable trigger circuit AB.

If, as a deviation from the condition considered above, it is not a question of a higher line bit pulse train frequency but of a lower line bit pulse train frequency, this will be expressed, in FIG. 3 which relates to this case, in a movement of the external timing pulse frame (lines be) wee) towards the right whereby the phase difference k will reduce.

In the left-hand part of FIG. 3 it has been assumed that hitherto the one intermediate word pulse train in accordance with row za was active, as shown in line wzae, wzbe) for the time slots 30 and 31. If it now proves that the phase difference between a pulse frame of the receiving-end, external word pulse train wee and a pulse frame of the intermediate word pulse train wza undershoots the given limit k, a change is made to the other intermediate word pulse train wzb which in the pulse frame of the intermediate word pulse train is associated with an extension of the time slot 0 of the synchronising time channel K$synch$ provided in addition to the actual telecommunications time channels K1 ... K31 as shown in line wzae, wzbe) of FIG. 3. In FIG. 3, for this purpose it has been indicated that this occurs when the eight time element of the time slot 0 of the receiving end, external word pulse train wee falls at least partially into the limit time zone shown in line a). Correspondingly, in the right-hand part of FIG. 3 it has been assumed that hitherto the other intermediate word pulse train in accordance with line zb) was active and that a corresponding change to the intermediate word pulse train in accordance with line za) associated with an extension of the time slot 0 is effected when the eighth time element of the time slot 0 of the receiving-end, external word pulse train wee falls into the limit time zone in accordance with line b). In the circuit arrangement shown in FIG. 1, the limit time zones are again defined by the signals occurring at the inputs a and b of the bistable trigger circuit AB; the pulse train input of the bistable trigger circuit AB is now supplied via the aforementioned AND gate U$sy$ with a switch-over pulse whenever the AND gate U$sy$ is released by the aforementioned equivalence gate with the presence of the time slot 0 in the external word pulse train and by the gate circuit LK connected by a second input to the output 8, corresponding to the eighth counter step, of the counter device Z$e8$, on the reaching of the eight counter step.

With the change to the particular other intermediate word pulse train which is associated with an increase of the time slot 0 of the synchronising time channel K$synch$ provided in addition to the actual telecommunications time channels K1 ... K31, however, the relevant time slot 0 of this synchronising time channel K$synch$ is doubled at the switching device side. As shown in line wi) of FIG. 3, this is the case with the change, shown in the left-hand part of FIG. 3 from intermediate word pulse train wza to the intermediate word pulse train wzb; in the event of the change, shown in the right-hand part of FIG. 3 from the intermediate word pulse train wzb to the intermediate word pulse train wza, this doubling of a time slot is avoided.

The switching-device end suppression or doubling of the synchronising time slot 0 leaves the items of information transmitted across the switching device in the time slots of the telecommunications time channels unimpaired. However, during the connection switch-through it must be ensured that this switch-through occurs within the particular time slot in question of the internal word pulse train even when a pulse frame of the internal word pulse train in accordance with the right-hand part of FIG. 2 or the left-hand part of FIG. 3 experiences a shortening or lengthening by one time slot. If, for the circuit arrangement shown in FIG. 1, it is assumed that the coupling switches kkm, mkg and the time channel switches ZS are in each case operated with the aid of a cyclic store of the length of one word pulse train period, it is only necessary, at the times in question, to shorten or lengthen the store cycle time by one time element once for a time interval corresponding to a word pulse train period.

Figure 4:
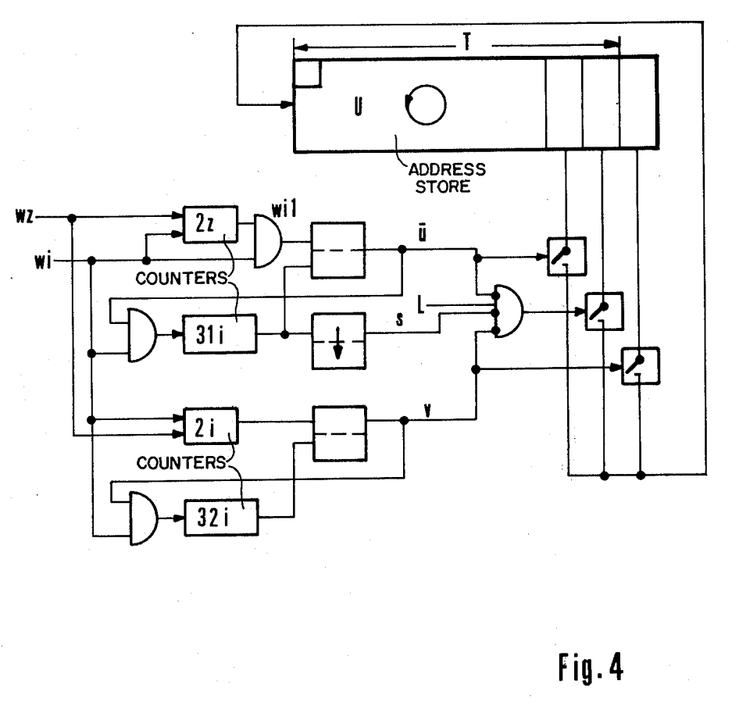
FIG. 4 shows further circuitry details.

A circuit principle which enables this to occur is shown in FIG. 4. In FIG. 4, a cyclic address store which may be used for the periodic pulsed operation of coupling switches and time channel switches is referenced U which, when a corresponding output is connected via a return switch Sn to the store input will be assumed to have a cycle time T corresponding to the word pulse train period. At an interval prior to and following the aforementioned store output, which corresponds to one time slot, the store U has two further store outputs, the first of which may be connected to the store input via a return switch Su and the second via a return switch Sv. Normally the return switch Sn is capable of transmission so that the store cycle time is equal to T. However, the return switch Sn can also be opened from the control circuit illustrated in the left-hand part of FIG. 4, and it is also possible to instead close the return switch Su or the return switch Sv so that the cyclic address store U has a cycle time which is reduced or increased by the length of one time slot. The control circuit has two input lines wz and wi which will be assumed to correspond to the pulse train lines of the same designation of the circuit arrangement shown in FIG. 1, so that the relevant intermediate word pulse train in accordance with lines wza, wzb) in FIGS. 2 and 3 occurs on the line wz, and the internal word pulse train in accordance with lines wi) in FIGS. 2 and 3 occurs on the line wi. As shown in the right-hand part of FIG. 2, the suppression of a time slot 0 of the internal word pulse train, which requires just one reduction in the store cycle time, has the effect that no timing pulse of the internal word pulse train occurs between the two timing pulses, corresponding to the time slots 0 and 1, of the intermediate word pulse train. This type of constellation is established in FIG. 4 with the aid of a counter $2z$ which has a counting volume 2 and which counts the intermediate word pulse train pulses and is in each case, reset by an internal word pulse train pulse, and which, when the second counter step is reached, releases a following AND gate for the next internal word timing pulse, which latter activates a following bistable trigger stage for the duration of 31 time slots of the internal bit pulse train; via its output line $u$ this trigger stage emitss a releasee signal to the return switch SU and a blocking signal to the return switch $Sn$ so that for the duration of 31 time slot of the internal bit pulse train the cycle time of the cyclic address store U is shortened by the duration of one time slot. The duration of 31 time slots of the internal bit pulse train is established with the aid of a counter device $31i$ which counts the corresponding pulses of the internal bit pulse train and which, when the last counter step has been reached, resets the aforementioned bistable trigger stage into the rest state. At the same time it activates a monostable trigger circuit for the duration of one time slot so that this monostable trigger circuit feeds a blocking signal via its output line $s$ to the return switch $Sn$ which is no longer blocked from the line $u$. This ensures that subsequently the addresses in the cyclic store U again circulate in the correct phase state with the normal store cycle time T. As shown on the left-hand part of FIG. 3, the doubling of a time slot 0 of the internal word pulse train, requiring just one increase in the store cycle time causes no timing pulse of the intermediate word pulse train to occur between two timing pulses of the internal word pulse train. A constellation of this type is established, in the circuit arrangement illustrated in FIG. 4, with the aid of a counter device $2i$ which has a counting volume 2, is fed with counting pulses from the line wi and may be reset from the line wz, and which, when the second counter *step* is reached, activates a following bistable trigger circuit for the duration of 32 time slots. During these 32 time slots i.e. for the duration of one pulse frame, the bistable trigger circuit feeds a release signal via its output line $v$ to the return switch $Sv$ and a blocking signal to the return switch $Sn$ so that for the duration of 32 time slots of the internal word pulse train i.e. for the duration of a timing pulse frame, the cycle time of the cyclic address store U is extended by the duration of one time slot. The 32 time slots of the internal word pulse train are counted by means of a counter device $32i$ which, when the 32nd counter step is reached, resets the aforementioned bistable trigger stage into the rest state.

In FIG. 2, the marking of the timing pulses of the time slots 0 of the internal word pulse train is to further indicate that in the circuit arrangement shown in FIG. 1, these word timing pulses are suppressed in the event of the input-end operation of the one-word-intermediate store JZ. In the circuit arrangement illustrated in FIG. 1, for this purpose between the pulse train line wi which conducts the internal word pulse train and the pulse train control line wis which operates the one-word-intermediate store JZ at the input end, there is interposed a blocking element Gis which is held in the blocking state by a bistable trigger circuit JS in each case from the first intermediate word pulse train pulse occurring during the time slot 0 of the external word pulse train on the pulse train line wz until the first intermediate word pulse train pulse occurring after the time slot 0 of the external word pulse train on the pulse train line wz, so that the PCM word in each case to be transmitted in time slot 31 remains stored in the one-word-intermediate store JZ for a further time slot interval. The lines wzas), wzbs) in FIGS. 2 and 3 show that this also applies correspondingly to the transmitting-end transmission of the relevant PCM word with the intermediate word pulse train. However, lines wes) of FIGS. 2 and 3 show that there is no second transmission of the PCM word to be transmitted in time slot 31 with the transmitting-end external word pulse train, but that instead the time slot 0 of the synchronising time channel K*synch* can be used normally on the t.d.m. transmitting line GML (see FIG. 1). For this purpose in the circuit arrangement shown in FIG. 1, between the parallel-serial converter P/S and the preceding one-word-intermediate store ZE there is provided a gating-in device which gates in a synchronising word to be transmitted over the PCM t.d.m. transmission line in the synchronising time channel K*synch* provided in addition to the actual telecommunications time channels, in the time slot 0 of the transmitting-end external word pulse train. As can be seen from FIG. 1, this gating-in device can consist of a logic coupling or linking circuit which, controlled from a counter device Ze 32 which counts the time slots of the external word pulse train and has a counting volume corresponding to the number of time channels, in each case connects the parallel-serial converter P/S with a synchronising word generator Sy in the time slot 0 of a pulse frame of the transmitting end external word pulse train and with the one-word-intermediate store ZE in the other time slots of the pulse frame. Correspondingly it is also possible to provide between the serial-parallel converter S/P and the following one-word-intermediate store EZ a gating-out device serving to gate out PCM words which are transmitted over the PCM t.d.m. tnansmission line in a special time channel provided in addition to the actual telecommunications time channels, such as a synchronising word or a signalling word, as merely indicated, however, in FIG. 1.

With regard to the coincidence, shown in the graphic illustration in FIGS. 1, 2 and 3, of the receiving-end, external word pulse train with the transmitting-end external word pulse train, of the receiving-end intermediate word pulse train with the transmitting-end intermediate word pulse train and of the receiving-end internal word pulse train with the transmitting-end, internal word pulse train it should also be pointed out that this illustration is based on the condition that only negligibly small processing times and transit times occur in the part of the circuit arrangement further to the right of FIG. 1. If this condition is not fulfilled, there will be further corresponding phase shifts of the transmitting-end word pulse-train pulse frames in relation to the receiving-end word pulse-train pulse frames.

It should also be noted in particular that although the above characterisation of the invention speaks specially of an output-end operation of an in each case preceding one-word-intermediate store (serial-parallel converter, PAM-PCM coder) and of an input-end operation of an in each case following one-word-intermediate store (parallel-serial converter, PCM-PAM decoder), as also indicated in FIG. 1, such an output-end and input-end operation can be also realised in that, as a concrete example, only the particular following one-word-intermediate store is operated at the input end.

Finally it should also be pointed out that when a plurality of PCM t.d.m. transmission lines KML-GML in FIG. 1 are connected to a common t.d.m. busbar ZMS in FIG. 1 via coupling switches $kkm$, $mkg$, operable at switching phases assigned to the relevant lines, in FIG. 1 naturally for each transmission line it is necessary to use a special switching phase, displaced in relation to the other switching phases, witin each time slot, which must be taken into account accordingly for the operation of the coupling switches and of the time channel switches ZS participating in the relevant connections, in FIG. 1.

While there is shown and described present preferred embodiments of the invention, it is to be distinctly understood that the invention is not limited thereto, but may be otherwise variously embodied and practiced within the scope of the following claims.

What is claimed is:

1. A time-division-multiplex arrangement for compensating changes in the mutual phase position of the timing pulse frames of a PCM-time-division-multiplex transmission line, comprising means defining a transmitting end and a receiving end for the time-division-multiplex arrangement, a series/parallel converter provided at said receiving end, a first one-word intermediate store arranged in circuit with said series/parallel converter, said one-word intermediate store having an input side and an output side, means for operating the input side of said first one-word intermediate store in an external word pulse train corresponding to a received bit pulse train, means for operating the output side of said first one-word intermediate store in one of two uniformly mutually offset intermediate word pulse trains, a second one-word intermediate store having an output side connected in circuit with the first one-word intermediate store, means for operating the second one-word intermediate store at its output side in an internal word pulse train, a parallel/series converter connected in circuit at the transmitting end, a first one-word intermediate store having an input side and an output side in circuit with the parallel/series converter, means for operating said output side of the first one-word-intermediate store at an external word pulse train at the transmitter end, means for controlling said input side of said first one-word intermediate store at the transmitter end in one of two uniformly mutually shifted intermediate word pulse trains, a second one-word intermediate store arranged in circuit with said first one-word intermediate store at the transmitter end, means which in the presence of phase differences which vary by a predetermined amount from a given limit between the pulse frames of the external word pulse train and pulse frames of the momentarily active intermediate word pulse train initiate a change to the other intermediate word pulse train, means for controlling the one-word intermediate store both at the receiver end and at the transmitter end with the same intermediate word pulse train of both uniformly mutually shifted intermediate word pulse trains with the period of the internal word pulse train of the time-division-multiplex apparatus, and means for directly connecting at the receiver end the output of the second one-word intermediate store and at the transmitter end the input of the second one-word intermediate store with the time-division-multiplex arrangement for transmitting in parallel form the arriving PCM-words in the internal word pulse train.

2. The time-division-multiplex arrangement as claimed in claim 1, characterised in that in the event of a phase difference, which overshoots a given limit (1), between a pulse frame of the receiving-end, external word pulse train (wee) and a pulse frame of the intermediate word pulse train ($wza$, $wzb$) a change is made to the particular other intermediate word pulse train ($wzb$, $wza$) which in the pulse frame of the intermediate word pulse train ($wza$, $wzb$) is associated with a shortening of the time slot (0) of a synchronising- or signalling time channel (K$synch$) provided in addition to the actual telecommunications time channels, and the relevant time slot (0) of this synchronising or signalling time channel (K$synch$) is suppressed.

3. The time-division-multiplex arrangement as claimed in claim 1, characterised in that in the event of a phase difference, which undershoots a given limit ($k$), between a pulse frame of the receiving-end external word pulse train (wee) and a pulse frame of the intermediate word pulse train ($wza$, $wzb$), a change is made to the particular other intermediate word pulse train ($wzb$, $wza$) which in the pulse frame of the intermediate word pulse train ($wza$, $wzb$) is associated with an increase in the time slot (0) of the synchronising- or signalling time channel (K$synch$) provided in addition to the actual telecommunications time channels, at the switching device-end, however, and the relevant time slot (0) of this synchronising or signalling time channel (K$synch$) is doubled.

4. The time-division-multiplex arrangement as claimed in claim 1, characterised in that a gating-out device provided between the serial-parallel converter (S/P) and the one word-intermediate store (EZ) and a gating-in device provided between the parallel-serial converter (S/P) and the one word-intermediate store (ZE) gates in and out PCM-words transmitted over the PCM-time division-multiplex transmission line in a special time channel (K$synch$) provided in addition to the actual telecommunications time channels.

5. The time-division-multiplex arrangement as claimed in claim 1, characterised in that the one word-intermediate stores (ZJ, JZ) operated at the output side and at the input side in the internal word pulse train ($wi$) of a plurality of PCM -time-division-multiplex transmission lines (KML-GML) is connected to a common time-division-multiplex busbar (ZMS) via coupling switches ($kkm$, $mkg$) operable at switching phases assigned to the relevant lines.

6. The time-division-multiplex arrangement as claimed in claim 5, characterised in that a PCM-PAM decoder interposed between the one word-intermediate store (ZJ) operated at the output side in the internal word pulse train ($wi$) and the associated coupling switches ($kkm$), and a PAM-PCM coder is interposed between the one word-intermediate store (JZ) operated at the input side in the internal word pulse train (wi) and the associated coupling switches (mkg), and that the common time-division-multiplex busbar (ZMS) forming a concentrator multiplex busbar is connected with a plurality of telephone subscribers (Tln) thus combined in a concentrator via a time channel switch (ZS) connected to a PAM subscriber circuit (TS).

7. The time-division-multiplex arrangement as claimed in claim 1, characterised in that in the event of a phase difference, which undershoots a given limit (k), between a pulse frame of the receiving-end external word pulse train (wee) and a pulse frame of the intermediate word pulse train (wza, wzb), a change is made to the particular other intermediate word pulse train (wzb, wza) which in the pulse frame of the intermediate word pulse train (wza, wzb) is associated with an increase in the time compartment (0) of a synchronising- or signalling time channel (Ksynch) *provided in addition to the actual telecommunications time channels, and the relevant time compartment (0) of this synchronising or signalling time channel (Ksynch) is doubled.*

8. The time-division-multiplex arrangement as claimed in claim 1, characterised in that a gating-out device provided between the serial-parallel converter (S/P) and the one word-intermediate store (EZ) gates out PCM-words transmitted over the PCM-time-division-multiplex transmission line in a special time channel (Ksynch) provided in addition to the actual telecommunications time channels.

9. The time-division-multiplex arrangement as claimed in claim 1, characterised in that a gating-in device provided between the parallel-serial converter (S/P) and the preceding one word-intermediatee store (ZE) gates in PCM-words transmitted over the PCM-time-division multiplex transmission line in a special time channel (Ksynch) provided in addition to the actual telecommunications time channels.

* * * * *